(No Model.)
L. BERETZ.
SODA WATER APPARATUS.
No. 334,159. Patented Jan. 12, 1886.
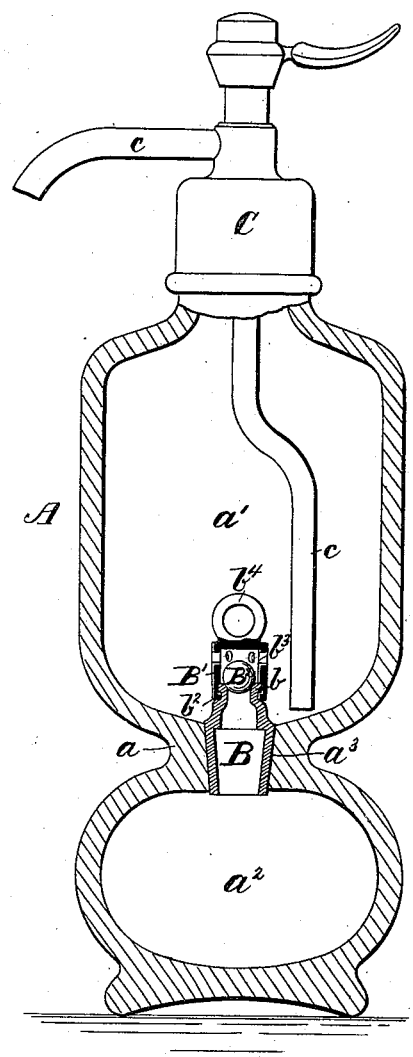
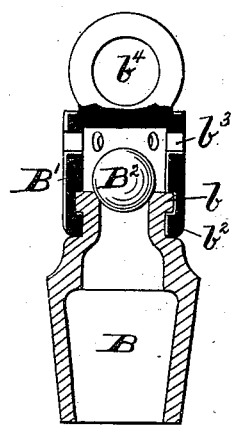
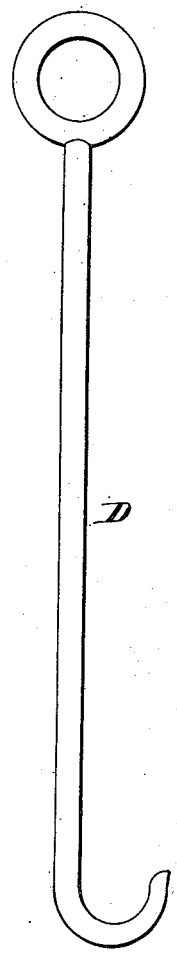
Attest:
W. E. Boulter,
C. M. Gallaher.
Inventor:
Ludwig Beretz
per Henry Orth (N. E. B.)
his atty.

UNITED STATES PATENT OFFICE.

LUDWIG BERETZ, OF VIENNA, AUSTRIA-HUNGARY, ASSIGNOR OF ONE-HALF TO C. STOLZLE'S SÖHNE, OF SAME PLACE.

SODA-WATER APPARATUS.

SPECIFICATION forming part of Letters Patent No. 334,159, dated January 12, 1886.

Application filed August 15, 1885. Serial No. 174,467. (No model.) Patented in France May 23, 1885, No. 169,127; in Germany May 23, 1885; in Italy June 30, 1885, XIX, 18,446, and XXXVI, 435, and in Austria-Hungary July 18, 1885, No. 10,122 and No. 37,900.

*To all whom it may concern:*

Be it known that I, LUDWIG BERETZ, a subject of the Emperor of Austria-Hungary, residing at Vienna, in the Province of Lower Austria, in the Empire of Austria-Hungary, have invented certain new and useful Improvements in Soda-Water Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improvement in soda-water apparatus, and has for its object to produce an apparatus of this kind which is of simple construction and which is adapted to be readily cleaned whenever this may be required.

The apparatus consists, essentially, of a vessel divided into two compartments and a valve controlling the communication between the two chambers or compartments, in the lower one of which is generated the carbonic acid, while in the upper one is placed the water necessary for the production of the beverage.

The apparatus which I have devised is of extremely simple construction and will be found to differ greatly in this respect from the soda-water apparatus now in use.

Although I have shown in the accompanying drawings a form of the vessel which I prefer, yet it will be readily perceived that the form of the vessel may be greatly modified, and I do not, therefore, wish to limit myself to the exact form of vessel.

Other modifications in the construction and arrangement of the parts employed in my apparatus can obviously be made without altering the nature of my invention.

In order that my invention may be readily understood, I will proceed to describe the same in detail, referring to the accompanying drawings, in which—

Figure 1 is a sectional elevation of the improved apparatus; Fig. 2, a vertical section of the removable valve-chamber cap and valve detached, on an enlarged scale. Fig. 3 is an elevation of the hook or extractor for removing the valve-chamber from its seat within the vessel, said hook or extractor being shown also on an enlarged scale.

In the production of my apparatus I may use any suitable material—as, for instance, glass or metal—and it will be understood that I do not limit myself to the character of the material employed.

A indicates a vessel having any desirable capacity. I have shown this vessel as provided with a contracted portion or neck, $a$, which divides the vessel into two compartments or chambers, $a'\ a^2$, of unequal capacity. This contracted portion or neck $a$ of the vessel is provided with a conical-shaped opening, $a^3$. Within this opening is fitted closely a valve-chamber, B, also of a tapering or conical form at its lower portion, and terminating at its top in an annular bead or flange, $b$.

Upon the valve-chamber B is placed a cap or cover, B', provided at its lower edge with an inwardly-extending flange, $b^2$, which, engaging under the bead or flange $b$ of the chamber B, holds the cap B' firmly in place on the chamber B. The cap B' is further provided with a number of apertures or perforations, $b^3$, and a ring, $b^4$, at its upper end, for a purpose presently to be described.

Within the cap B', and seated upon the upper end of the chamber B, is a ball-valve, $B^2$. It will be seen that by raising the valve from or lowering it upon its seat communication between the chambers $a'$ and $a^2$ of the vessel may be established or cut off, as desired, the communication between the chambers $a'\ a^2$ being through the perforations $b^3$ and the interior of the valve-chamber B, all as plainly shown in Figs. 1 and 2.

The valve-chamber B, I preferably make of glass, while the cap B' for said chamber is preferably made of metal. The upper end of the vessel A is closed by a cover, C, which is screwed thereon. This cover is provided with a draft-tube, $c$, which extends from the outside of the cover down into the chamber or compartment $a'$ of the vessel and nearly to the bottom of said compartment, as plainly shown in Fig. 1, the tube being slightly bent to avoid coming in contact with the cap B' of the vessel B.

When it is necessary to fill the chamber $a^2$ with the chemicals necessary for generating the carbonic acid, or when it is desired to clean said chamber, the valve-chamber with its connected parts is removed from its seat in the contracted portion $a$ of the vessel to allow free access to the chamber $a^2$. For this purpose I employ an extractor, D, (shown in Fig. 3,) hooked at its lower end, which, when the cover C with its tube is removed, is inserted in the ring $b^4$ of the cap B' of valve-chamber B, and in this manner the latter with its connected parts may be withdrawn either entirely from the vessel or enough to allow access to the chamber $a^2$ through the perforation $a^3$.

In using the apparatus, I withdraw the chamber B and the parts connected therewith from the perforation $a^3$. The chemicals necessary for the production of the carbonic acid are then placed in the chamber $a^2$. The removed parts are then placed in their proper position, the valve-chamber seating in the perforation $a^3$. The water necessary for the production of the beverage is then placed in the upper compartment or chamber, $a'$, after which the cover C is screwed on the vessel A to close the same. As long as the vessel A is maintained in a vertical or nearly vertical position, the valve $B^2$ will be held tightly to its seat by the pressure of the water; but if the vessel is tilted somewhat the valve will roll from its seat slightly, thus allowing some of the water to pass through the chamber B into the lower compartment. As soon as the water enters the latter, chemical action takes place, after which the vessel is brought into a vertical position. The carbonic acid developed in chamber $a^2$ raises the valve $B^2$ and ascends into the chamber $a'$ through the apertures $a^3$, permeating the water in said chamber until the pressures in both chambers $a'$ $a^2$ are equalized.

Having thus described my invention, what I claim, and desire to secure by Letters Patent, is—

The vessel A, contracted at $a$, and having a conical passage or seat, $a^3$, in said contracted portion, in combination with the conical valve-chamber B, having a flaring mouth, a ball-valve seated in said flaring-mouth, and a confining-cap, B', attached to said flaring mouth and provided with ports $b^2$, and a hand-hole for removing the cap and valve-chamber from the seat of the latter, substantially as and for the purpose specified.

In testimony whereof I affix my signature in presence of two witnesses.

LUDWIG BERETZ.

Witnesses:
EDMON JUSSEN,
OTTO SCHEFFER.